US011138274B2

United States Patent
Yao et al.

(10) Patent No.: US 11,138,274 B2
(45) Date of Patent: Oct. 5, 2021

(54) VIRTUALIZATION ENVIRONMENT PROVIDING USER-BASED SEARCH INDEX ROAMING AND RELATED METHODS

(71) Applicant: CITRIX SYSTEMS, INC., Fort Lauderdale, FL (US)

(72) Inventors: Yajun Yao, Jiangsu (CN); Rulei Lin, Jiangsu (CN); Hai Xiang, Jiangsu (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 171 days.

(21) Appl. No.: 16/236,832

(22) Filed: Dec. 31, 2018

(65) Prior Publication Data
US 2019/0340203 A1 Nov. 7, 2019

Related U.S. Application Data

(60) Provisional application No. 62/667,090, filed on May 4, 2018.

(30) Foreign Application Priority Data

May 3, 2018 (CN) .......................... 201810413977.4

(51) Int. Cl.
| | |
|---|---|
| *G06F 17/00* | (2019.01) |
| *G06F 16/951* | (2019.01) |
| *G06F 16/23* | (2019.01) |
| *G06F 16/9535* | (2019.01) |
| *G06F 9/455* | (2018.01) |

(52) U.S. Cl.
CPC ........ *G06F 16/951* (2019.01); *G06F 9/45558* (2013.01); *G06F 16/2379* (2019.01); *G06F 16/9535* (2019.01); *G06F 2009/45595* (2013.01)

(58) Field of Classification Search
None
See application file for complete search history.

(56) References Cited

U.S. PATENT DOCUMENTS

| | | | |
|---|---|---|---|
| 9,176,744 B2 | 11/2015 | Lee | |
| 9,538,345 B2 | 1/2017 | Sah et al. | |
| 10,346,550 B1* | 7/2019 | Botta | G06F 16/148 |
| 10,528,627 B1* | 1/2020 | Dunsmore | H04L 41/0681 |
| 2008/0189248 A1* | 8/2008 | Chung | G06F 16/282 |
| 2013/0227564 A1* | 8/2013 | Asayama | G06F 16/176 |
| | | | 718/1 |

(Continued)

OTHER PUBLICATIONS

Anonymous "Dealing with Outlook search in non-persistent RDS environments" https://docs.microsoft.com/en-us/deployoffice/rds-outlook-search; Aug. 23, 2017; pp. 1.

*Primary Examiner* — Hasanul Mobin
(74) *Attorney, Agent, or Firm* — Allen, Dyer, Doppelt + Gilchrist, PA (57) ABSTRACT

A method may include, in an initial virtual machine session for a user running on a virtualization server, loading a roaming user profile for the user, generating a user search index database for the user, and indexing the roaming user profile in the user search index database. In a subsequent virtual machine session for the user running on the at least one server, the user search index database for the user may be loaded and the index for the roaming user profile obtained therefrom without re-indexing the roaming user profile.

17 Claims, 8 Drawing Sheets

(56) References Cited

U.S. PATENT DOCUMENTS

| | | | |
|---|---|---|---|
| 2013/0238673 A1* | 9/2013 | Rokuhara | G06F 9/45558 |
| | | | 707/821 |
| 2014/0258533 A1* | 9/2014 | Antony | G06F 9/45558 |
| | | | 709/226 |
| 2015/0019733 A1 | 1/2015 | Suryanarayanan et al. | |
| 2015/0032436 A1 | 1/2015 | van de Kamp | |
| 2015/0199207 A1 | 7/2015 | Lin et al. | |
| 2016/0092960 A1* | 3/2016 | Deshpande | G06Q 30/0625 |
| | | | 705/26.62 |
| 2016/0124665 A1* | 5/2016 | Jain | H04L 61/2007 |
| | | | 711/162 |
| 2016/0188667 A1* | 6/2016 | Maughan | G06F 16/9535 |
| | | | 707/715 |
| 2016/0323104 A1* | 11/2016 | Mayers | H04L 63/0407 |
| 2017/0083354 A1 | 3/2017 | Thomas et al. | |
| 2017/0353328 A1* | 12/2017 | Chickering | H04L 69/324 |
| 2019/0163580 A1* | 5/2019 | Pandey | G06F 11/1438 |
| 2019/0227878 A1* | 7/2019 | Agarwal | G06F 8/658 |
| 2019/0258963 A1* | 8/2019 | Guo | G06N 20/00 |

* cited by examiner

FIG. 8

VIRTUALIZATION ENVIRONMENT PROVIDING USER-BASED SEARCH INDEX ROAMING AND RELATED METHODS

CROSS-REFERENCE TO RELATED APPLICATIONS

This application claims the benefit of U.S. prov. app. No. 62/667,090 filed May 4, 2018, as well as Chinese app. no. 201810413977.4 filed May 3, 2018, both of which are hereby incorporated herein in their entireties by reference.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, along with additional computing devices to provide management and customer portals for the cloud system.

Cloud systems may dynamically create and manage virtual machines for customers over a network, providing remote customers with computational resources, data storage services, networking capabilities, and computer platform and application support. For example, a customer in a cloud system may request a new virtual machine having a specified processor speed and memory, and a specified amount of disk storage. Within the cloud system, a resource manager may select a set of available physical resources from the cloud resource pool (e.g., servers, storage disks) and may provision and create a new virtual machine in accordance with the customer's specified computing parameters. Cloud computing services may service multiple customers with private and/or public components, and may be configured to provide various specific services, including web servers, security systems, development environments, user interfaces, and the like.

SUMMARY

A method may include, in an initial virtual machine session for a user running on a virtualization server, loading a roaming user profile for the user, generating a user search index database for the user, and indexing the roaming user profile in the user search index database. In a subsequent virtual machine session for the user running on the at least one server, the user search index database for the user may be loaded and the index for the roaming user profile obtained therefrom without re-indexing the roaming user profile.

In accordance with one example, the method may further include registering the user search index database with a search service on the virtualization server. More particularly, the user search index database may be updated using the search service based upon user profile changes over time. Moreover, in the subsequent virtual machine session, a user application may be run which is configured to search the user search index database and has a plugin associated therewith, and the search service may update the user search index database based upon the plugin, for example.

In an example implementation, the user search index database for the user may be generated by partitioning a central desktop database into the user search index database. Furthermore, in an example embodiment the user search index database does not include machine specific information associated with the initial virtual machine session. By way of example, the roaming user profile may include display configuration settings.

A related computing system may include at least one client computing device associated with a user, and a virtualization server. The virtualization server may be configured to run virtual machine sessions for the at least one client computing device, and in an initial virtual machine session, load a roaming user profile for the user, generate a user search index database for the user, and index the roaming user profile in the user search index database. In a subsequent virtual machine session, the virtualization server may load the user search index database for the user and obtain the index for the roaming user profile therefrom without re-indexing the roaming user profile.

A related non-transitory computer-readable medium is also provided which may have computer-executable instructions for causing a virtualization server to perform steps including, in an initial virtual machine session for a user, loading a roaming user profile for the user, generating a user search index database for the user, and the roaming user profile in the user search index database. Furthermore, in a subsequent virtual machine session for the user, the user search index database may be loaded and the index for the roaming user profile may obtained therefrom without re-indexing the roaming user profile.

DETAILED DESCRIPTION

The present description is made with reference to the accompanying drawings, in which example embodiments are shown. However, many different embodiments may be used, and thus the description should not be construed as limited to the particular embodiments set forth herein. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, solid-state storage devices, and/or any combination thereof.

Figure 1:
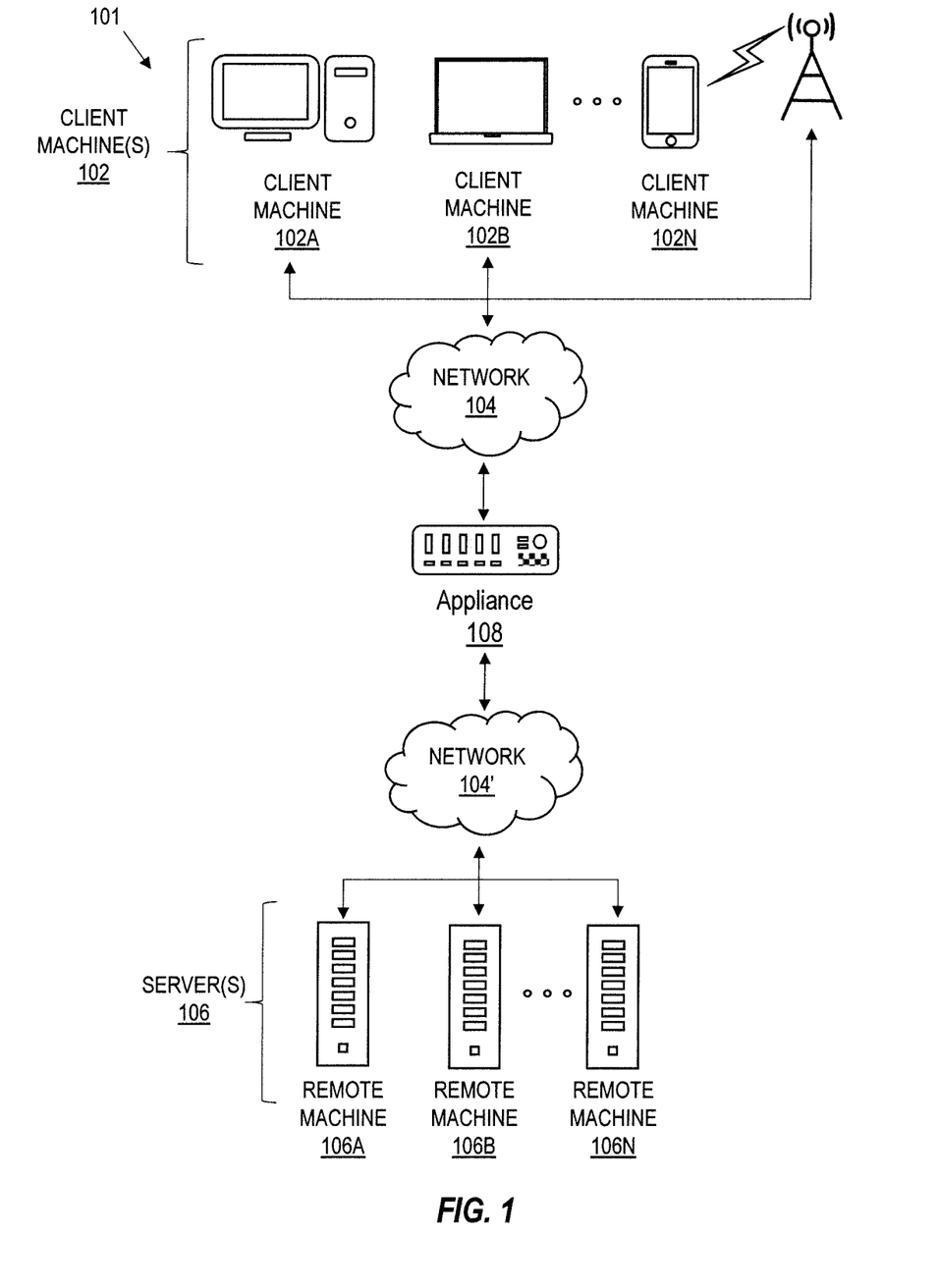
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer or Transport Layer Security (TLS) Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
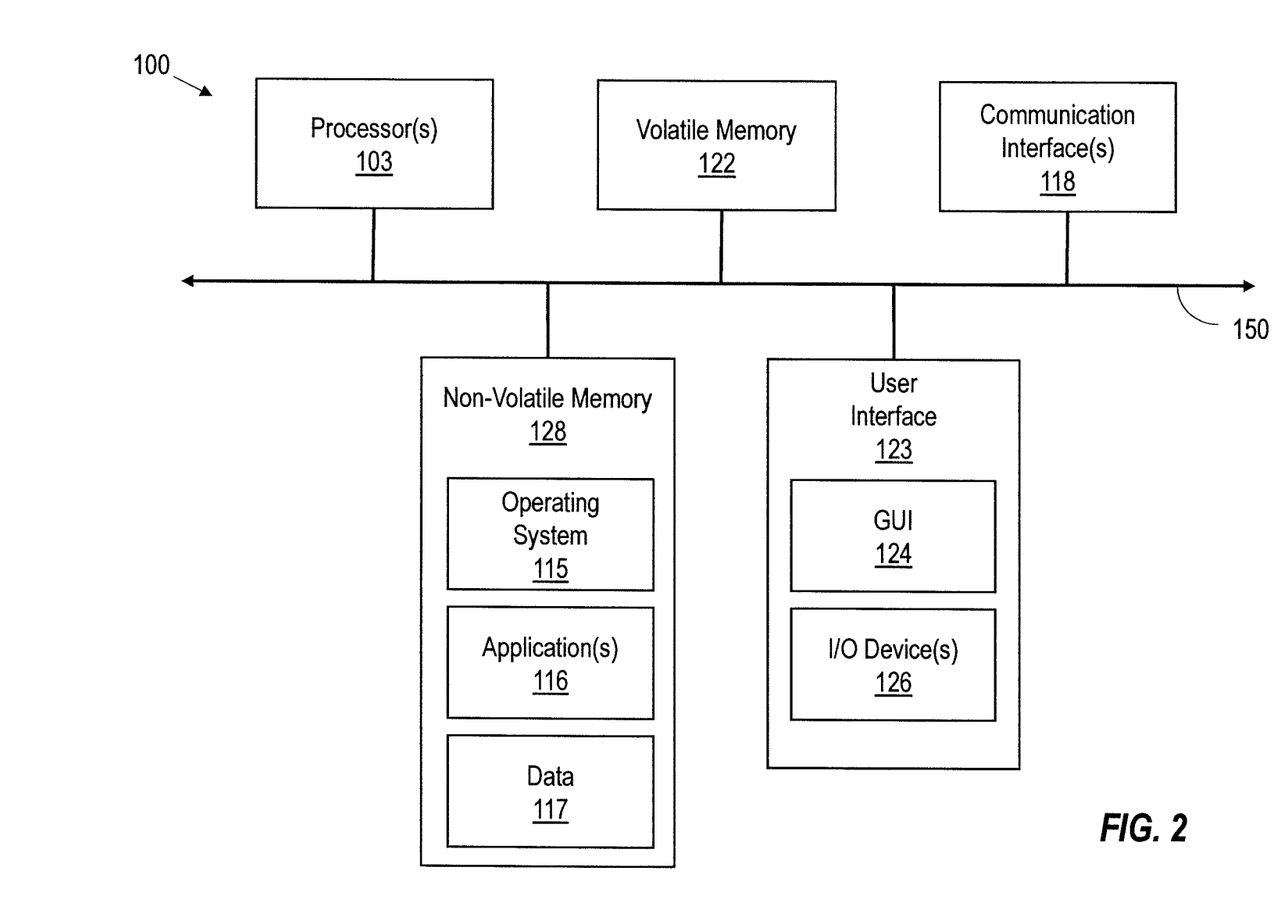
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 6:
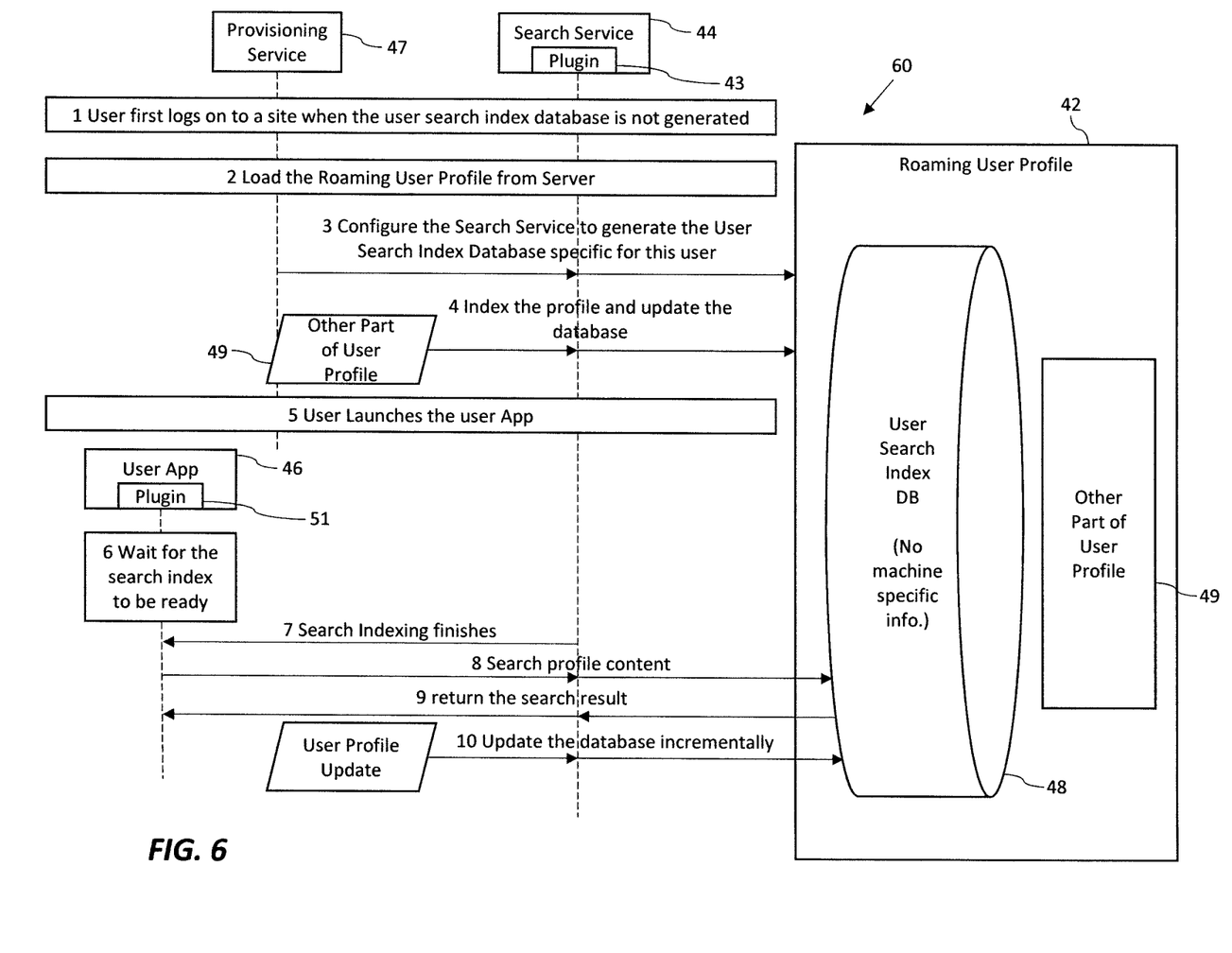
FIG. 6 is a sequence diagram illustrating a workflow using the user-based search index approach of FIG. 4 where the database is not initially generated.
Figure 7:
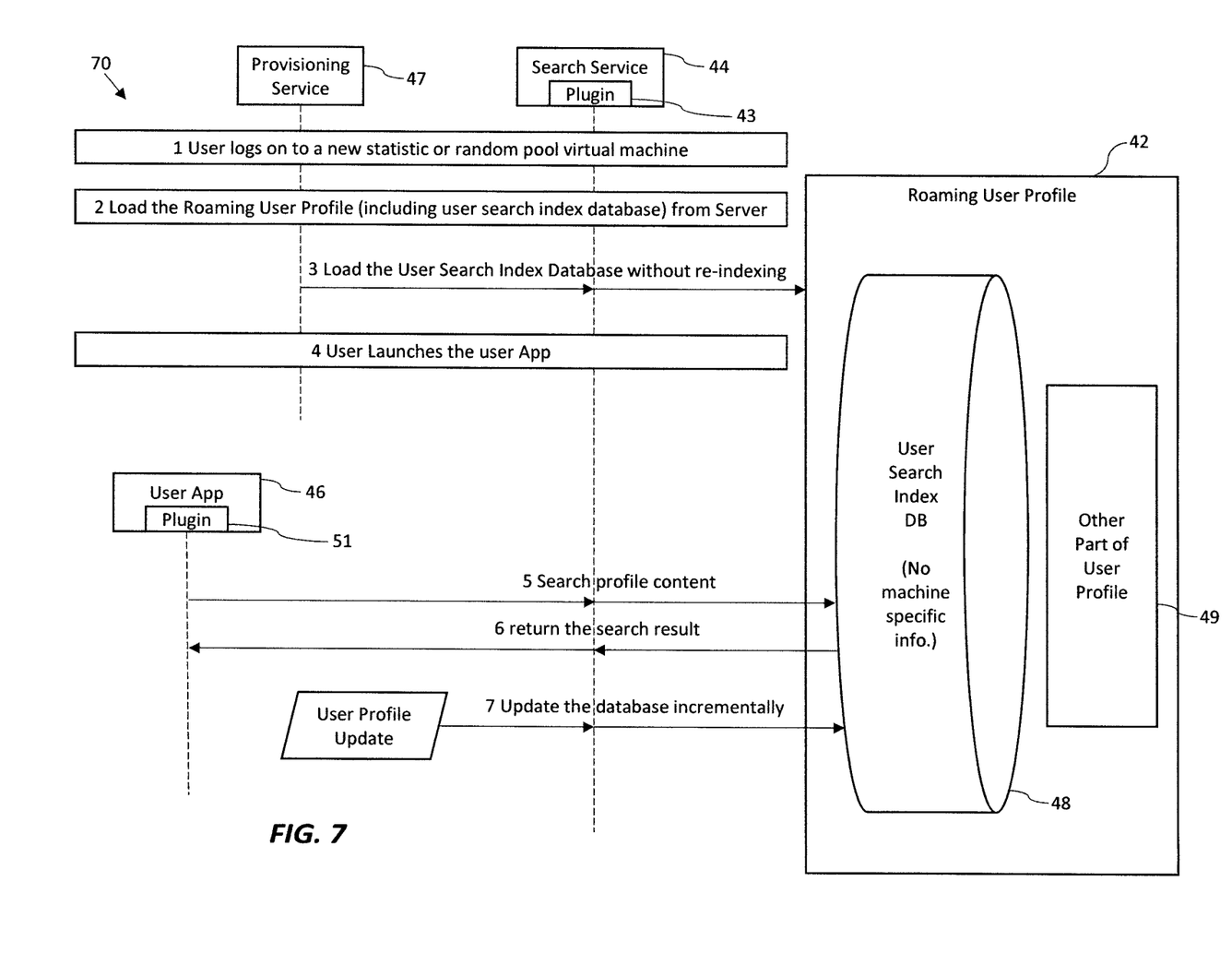
FIG. 7 is a sequence diagram illustrating a workflow using the user based search index approach of FIG. 4 when the database already includes the valid index for the user profile.
Figure 8:
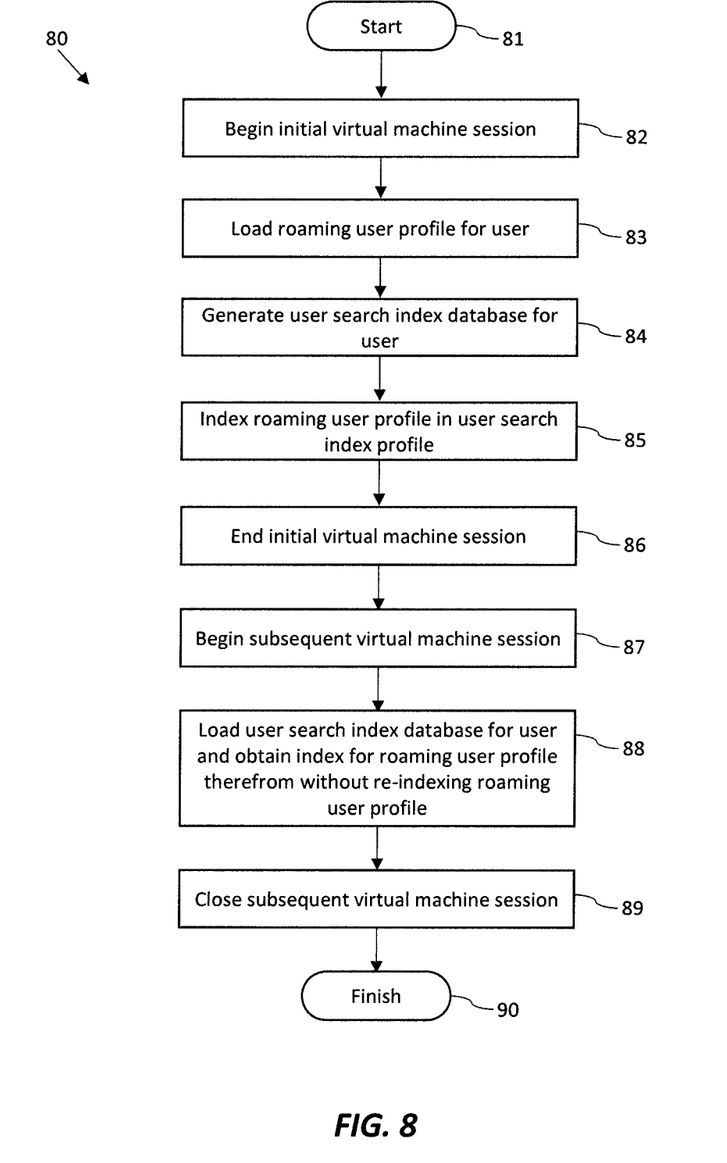
FIG. 8 is a flow diagram illustrating method aspects associated with the system of FIG. 4.

Turning now to FIGS. 3-7 and the flow diagram 80 of FIG. 8 which begins at Block 81, an approach for user-based search index roaming within a virtualization environment, such as discussed above, is now described. By way of background, in the desktop environment, the search index database used by the search service (e.g., Windows Search) is a central database dedicated to one machine. It includes a machine specific identity and cannot be used by the search service running on other machines. When any user logs in to this machine, the user can use the search service to search the central database for his profile without any problem.

However, in the virtualization environment, e.g., remote desktop or remote application hosted on virtual machines, the user is not dedicated to one specific virtual machine. During the user logon, the user may be assigned to a new virtual machine where the user's roaming profile does not include the original central search index database, which only exists on the previously assigned virtual machine. So, the user has to wait until the re-indexing finishes before he can use the search service to search his profile on this machine. In addition, even if the user is assigned to the same static virtual machine previously used, the user's roaming profile may already have updated, so the re-indexing has to be performed anyway.

If the user profile is relatively large (e.g., the size of Outlook .ost file used by the Office 365 (O365) can be up to 20 GB), it might take a few minutes or even half an hour for the search re-indexing to finish, which leads to a very poor user experience in using the O365 in virtual environment. Some software uses a different search service and search index algorithm to generate the user-based search index and a different interface to search. However, this changes the user's search experience.

Generally speaking, the present approach advantageously converts the native search index database from machine-based to user-based to make the search index database able to roam between virtual machines as part of the roaming user profile. By doing so, user apps may use the search service to search the user profile immediately without waiting for the time-consuming search re-indexing. In particular, this approach may provide several technical advantages that may improve the operation of a virtualized computing environment, including: a separate user-based search index database instead of a machine-based index; making the user-based search index part of the roaming profile to avoid the re-indexing; and maintaining the same user search interface as in a non-virtualized computing environment.

The following terminology will be used in the ensuing discussion:

Search Indexing—to collect, parse, and store search index into database to facilitate fast and accurate information retrieval.

Search Re-indexing—an action for the search service to index the content again when the original indexed search database is either not available or invalid.

Roaming User Profile—a concept that allows users to access their documents and have a consistent desktop experience, such as applications remembering toolbar positions and preferences, or the desktop appearance staying the same anytime from anywhere.

Random Pool Virtual Machine—the user specific data is cleared upon virtual machine reboot.

Static Virtual Machine—user specific data is kept upon virtual machine reboot.

The present approach advantageously provides a way to convert the search index database from machine-based to user-based, and puts it into the user's roaming profile by keeping the same native search service. Thus, the user's roaming profile can always include the latest user's profile itself as well as the latest user search index database dedicated for the user's profile. When the user logs on to any virtual machine, once the user receives their roaming profile, the user can use the search service to search for their profile immediately without re-indexing.

Figure 3:
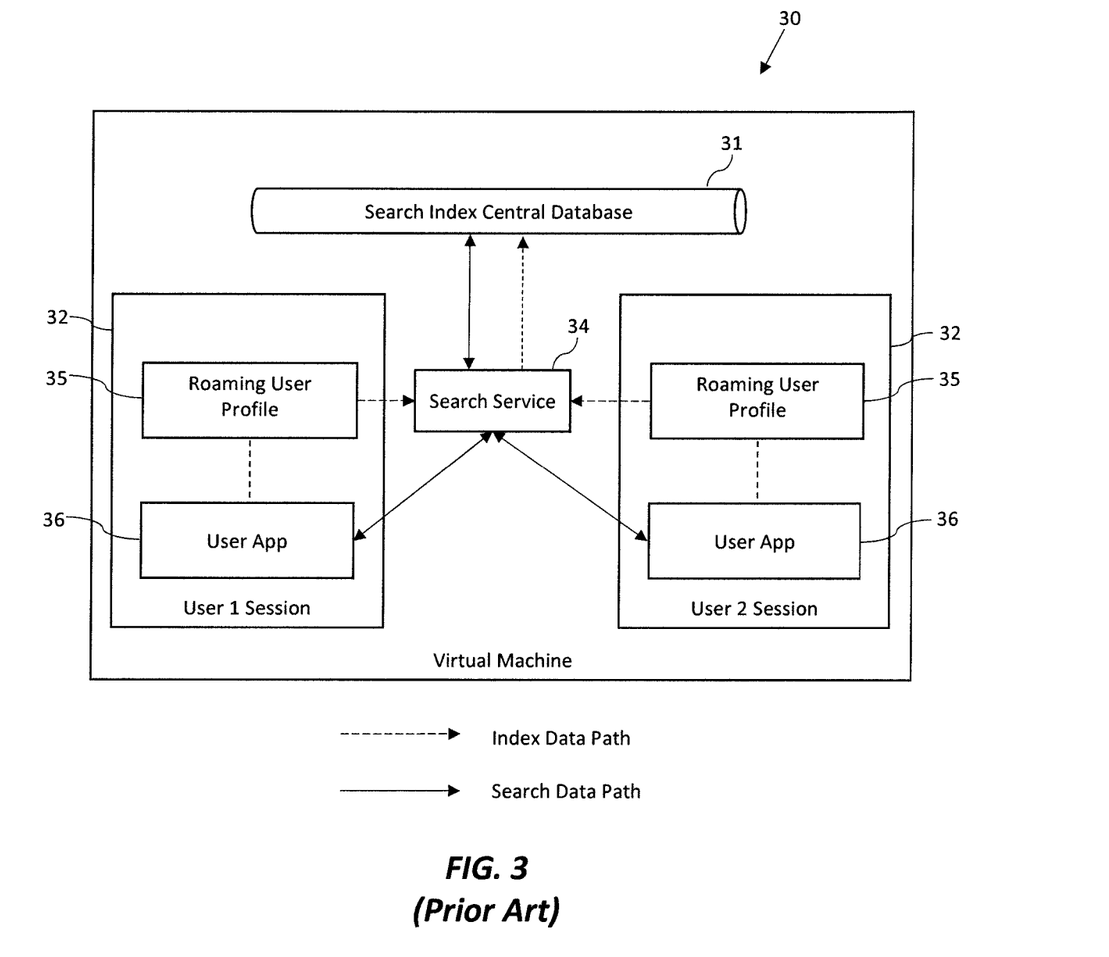
FIG. 3 is a schematic block diagram of a virtual machine (VM) implementing a conventional machine-based search index, where the search database is shared by all the users logging to the machine.
Figure 5:
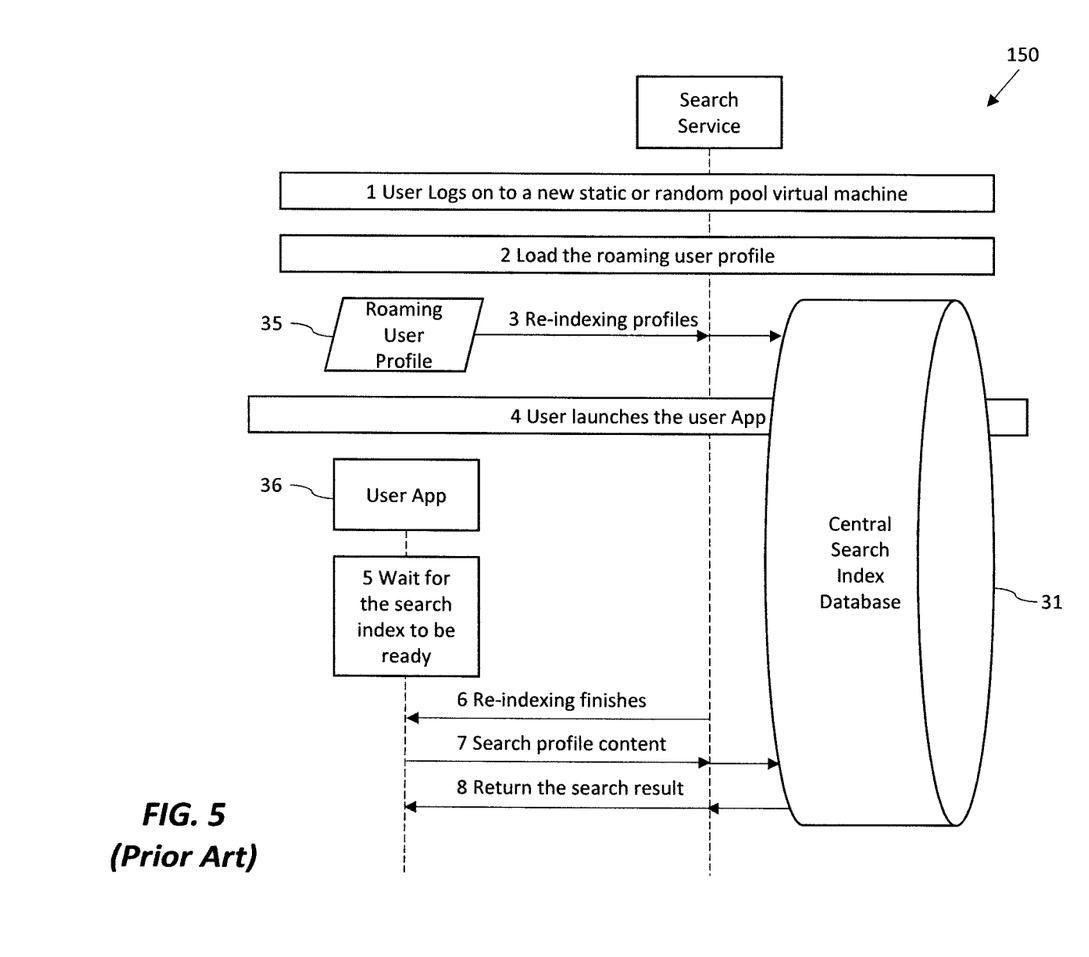
FIG. 5 is a sequence illustrating a workflow using the conventional machine-based search index approach of FIG. 3, where search re-indexing happens every time a user logs on to a new static VM or random pool VM.

By way of reference, FIG. 3 illustrates a conventional virtual machine 30 implementation using the existing machine-based search index approach described above, where the search database central database 31 is shared by all the user sessions logging to the virtual machine 30 via the search service 34. Each user session 32 illustratively includes a roaming user profile 35 and one or more user apps 35 running in the sessions. The sequence diagram 150 of FIG. 5 provides a workflow for the conventional system of FIG. 3 using the machine-based search index database 31, where search re-indexing happens every time a user logs on to a new static VM or random pool VM (Steps 1-3), and the user app 36 has to wait for the search index to be completed before receiving search results (Steps 5-8) each time another VM session is initiated.

Figure 4:
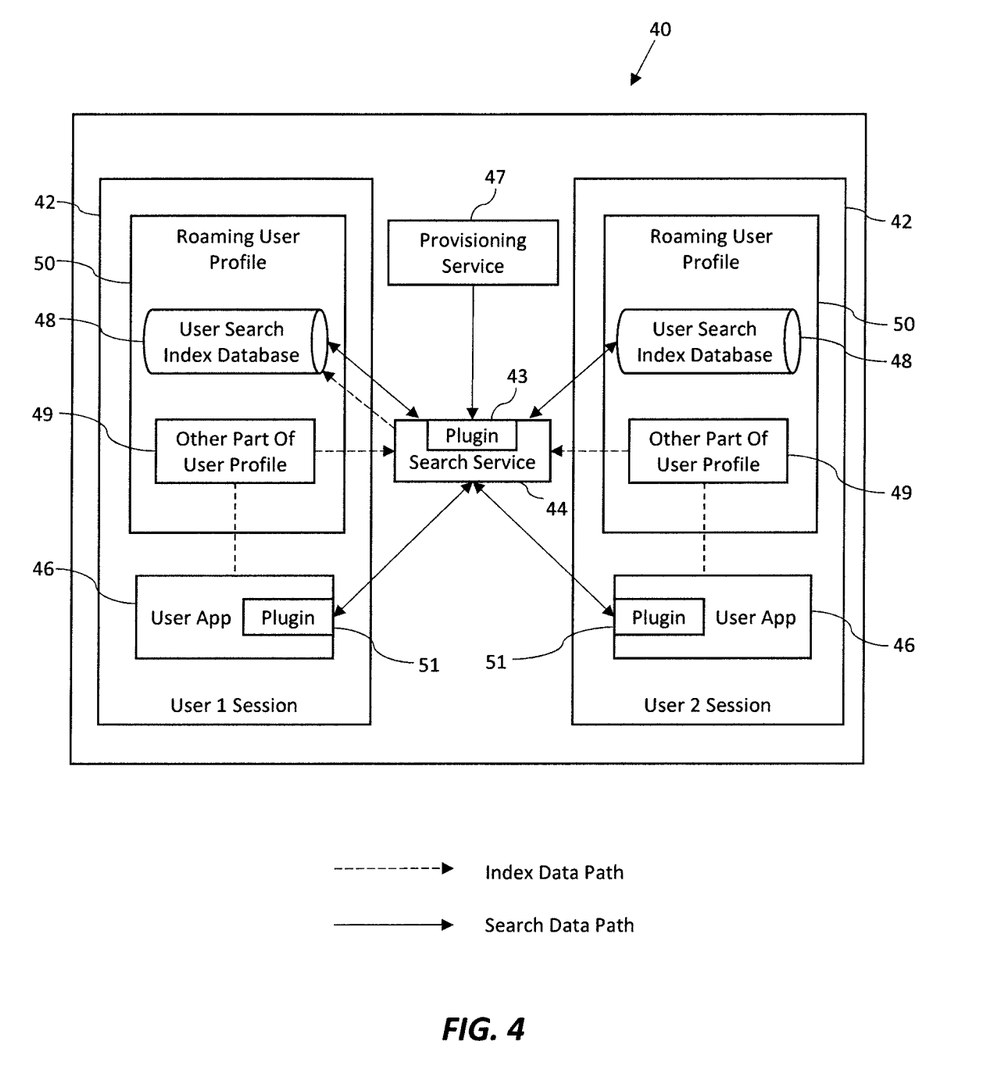
FIG. 4 is a schematic block diagram of a virtual machine implementing a user-based search index in accordance with an example implementation.

On the other hand, the virtual machine 40 of FIG. 4 illustrates an example approach for a user-based search index. More particularly, in the present example, a plugin 43 is installed in the search service 44. A provisioning service 47 is provided to configure the search service 44 via the search service plugin 43 to generate a user-based search index database 48, index other parts of the user profile 49 to the database 48 dedicated to this user, and update the database incrementally as the profile updates. The user search index database 48 is part of the roaming user profile 50, so it may be roamed from one virtual machine to another. A plugin 51 is installed to the selected user app 46 which uses the search service 44 to search the content of the user profile 50, so the selected user app always uses the user search index database 48 for searching. The user app 46 is transparent to the plugin 51 and the type of database it uses.

The sequence diagram 60 of FIG. 6 illustrates an example workflow in an initial virtual machine instance, where the user-based search index database 48 is not yet generated. When the user logons to a virtual machine 40 in a site to begin an initial virtual machine session (Step 1 of FIG. 6, Block 82 of FIG. 8), the roaming user profile 50 is loaded from the server (Step 2 of FIG. 6, Block 83 of FIG. 8). The search service 44 may then be configured to generate the user search index database 48 specific for the given user (Step 3 of FIG. 6, Block 84 of FIG. 8) for inclusion in the roaming user profile 42. The other part of the user profile 49, which may include user account or user data such as cached email data, etc., may be used to index the profile and update the database 48 (Step 4 of FIG. 6, Block 85 of FIG. 8). During the initial virtual machine session, the user may further launch the app 46 (Step 5 of FIG. 6), and the plugin 51 communicates with the plugin 43 and waits for the search index to be ready (Step 6 of FIG. 6). Once the search index finishes (Step 7 of FIG. 6), the app 46 may then search profile content from the user search index database 48 via the plugin 51 (Step 8 of FIG. 6) and the results returned accordingly (Step 9 of FIG. 6). User profile updates may be made to the user search index database 48 incrementally as they occur (Step 10 of FIG. 6) until the initial virtual machine session is closed (Block 86).

The sequence diagram 70 of FIG. 7 illustrates the workflow using the user-based search index database 48 in subsequent virtual machine sessions when the database already includes the valid index for the user profile (i.e., it has already been generated as shown in FIG. 6). More particularly, the user logs on to a new static or random pool virtual machine session (Step 1 of FIG. 7, Block 87 of FIG. 8). The roaming user profile 50 (including the user search index database 48) may be loaded directly from the server (Step 2 of FIG. 7), and the user search index database may advantageously be loaded without re-indexing (Step 3 of FIG. 7, Block 88 of FIG. 8) as discussed further above. Accordingly, as soon as the user app 46 is launched, the user search index database 48 is ready for a search of the user's profile content (Step 5 of FIG. 7). Again, no search re-indexing is necessary, and the user app 46 may advantageously use the search service 44 to search his profile immediately after the user app is launched. Results from the search are returned to the app 46 via the plugin 51 (Step 6 of FIG. 7). Here again, user profile updates may be added to the database 48 incrementally throughout the virtual machine session (Step 7 of FIG. 7). The method of FIG. 8 illustratively concludes after closing of the virtual machine session (Blocks 89-90).

It should be noted that the above-described approach may be used with platforms other than Windows. For example, the same mechanism described above may advantageously be implemented for another system like Linux which uses a central database for desktop search.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A method comprising:
    in an initial virtual machine session for a user running on a virtual machine at a virtualization server, the virtual machine having a machine specific identity associated therewith,
        loading a roaming user profile for the user,
        generating a user search index database for the user excluding the machine specific identity, and
        indexing the roaming user profile in the user search index database, the user search index database being roamable between different virtual machines as part of the roaming user profile; and
    in a subsequent virtual machine session for the user running on the virtualization server, loading the user search index database for the user and obtaining the index for the roaming user profile therefrom without re-indexing the roaming user profile.

2. The method of claim 1 further comprising registering the user search index database with a search service on the virtualization server.

3. The method of claim 2 further comprising updating the user search index database using the search service based upon user profile changes over time.

4. The method of claim 3 further comprising, in the subsequent virtual machine session, running a user application configured to search the user search index database and having a plugin application associated therewith; and wherein the search service updates the user search index database through the plugin application.

5. The method of claim 1 wherein generating the user search index database for the user comprises partitioning a central desktop database into the user search index database.

6. The method of claim 1 wherein the roaming user profile comprises display configuration settings.

7. A computing system comprising:
at least one client computing device associated with a user; and
a virtualization server configured to
run virtual machine sessions on virtual machines for the at least one client computing device,
in an initial virtual machine session on a virtual machine having a machine specific identity associated therewith, load a roaming user profile for the user, generate a user search index database for the user excluding the machine specific identity, and index the roaming user profile in the user search index database, the user search index database being roamable between different virtual machines as part of the roaming user profile, and
in a subsequent virtual machine session, load the user search index database for the user and obtain the index for the roaming user profile therefrom without re-indexing the roaming user profile.

8. The system of claim 7 wherein the virtualization server is further configured to register the user search index database with a search service.

9. The system of claim 8 wherein the virtualization server is further configured to update the user search index database using the search service based upon user profile changes over time.

10. The system of claim 9 wherein the virtualization server is further configured to, in the subsequent virtual machine session, run a user application configured to search the user search index database and having a plugin application associated therewith; and wherein the search service updates the user search index database through the plugin application.

11. The system of claim 7 wherein the virtualization server generates the user search index database for the user by partitioning a central desktop database into the user search index database therefrom.

12. The system of claim 7 wherein the roaming user profile comprises display configuration settings.

13. A non-transitory computer-readable medium having computer-executable instructions for causing a virtualization server to perform steps comprising:
in an initial virtual machine session for a user on a virtual machine having a machine specific identity associated therewith,
loading a roaming user profile for the user,
generating a user search index database for the user excluding the machine specific identity, and
indexing the roaming user profile in the user search index database, the user search index database being roamable between different virtual machines as part of the roaming user profile; and
in a subsequent virtual machine session for the user,
loading the user search index database for the user and obtaining the index for the roaming user profile therefrom without re-indexing the roaming user profile.

14. The non-transitory computer-readable medium of claim 13 further having computer-executable instructions for causing the virtualization server to register the user search index database with a search service on the virtualization server.

15. The non-transitory computer-readable medium of claim 14 further having computer-executable instructions for causing the virtualization server to update the user search index database using the search service based upon user profile changes over time.

16. The non-transitory computer-readable medium of claim 15 further having computer-executable instructions for causing the virtualization server to, in the subsequent virtual machine session, run a user application configured to search the user search index database and having a plugin application associated therewith; and wherein the search service updates the user search index database through the plugin application.

17. The non-transitory computer-readable medium of claim 13 wherein generating the user search index database for the user comprises partitioning a central desktop database to generate the user search index database therefrom.

* * * * *